Feb. 19, 1924.
W. R. UHLEMANN
OPTICIAN'S MEASURING INSTRUMENT
Filed May 9, 1922

1,484,366

Witness:
John Enders

Inventor:
William R. Uhlemann,
by Robert Burns
Atty.

Patented Feb. 19, 1924.

1,484,366

UNITED STATES PATENT OFFICE.

WILLIAM R. UHLEMANN, OF EVANSTON, ILLINOIS, ASSIGNOR TO UHLEMANN OPTICAL COMPANY, OF CHICAGO, ILLINOIS, A CORPORATION OF ILLINOIS.

OPTICIAN'S MEASURING INSTRUMENT.

Application filed May 9, 1922. Serial No. 559,628.

*To all whom it may concern:*

Be it known that I, WILLIAM R. UHLEMANN, a citizen of the United States, and resident of Evanston, in the county of Cook and State of Illinois, have invented a certain new and useful Improvement in Opticians' Measuring Instruments, of which the following is a specification.

This invention relates to instruments for use by opticians in attaining correct measurements of the nose with relation to the pupils of the eyes of a person being fitted with eyeglasses, with a view to a correct formation and arrangement of the nose bridge or rest of such eyeglasses, and the present improvement has for its objects:—

To provide a structural formation and association of parts and mechanisms in the above mentioned type of instruments, affording a compact and convenient arrangement of the parts, with an accurate indication of the distances of the respective sides from the median line of the nose of the person being fitted.

To provide a construction of the frame of the instrument adapted to afford proper clearance for the forehead of the person being tested, and avoid inconvenience to such person during the use of the instrument and without interference to the passage of light to the parts being gaged or measured, all as will hereinafter more fully appear.

In the accompanying drawing:—

Like reference numerals indicate like parts in the several views.

Figure 1:
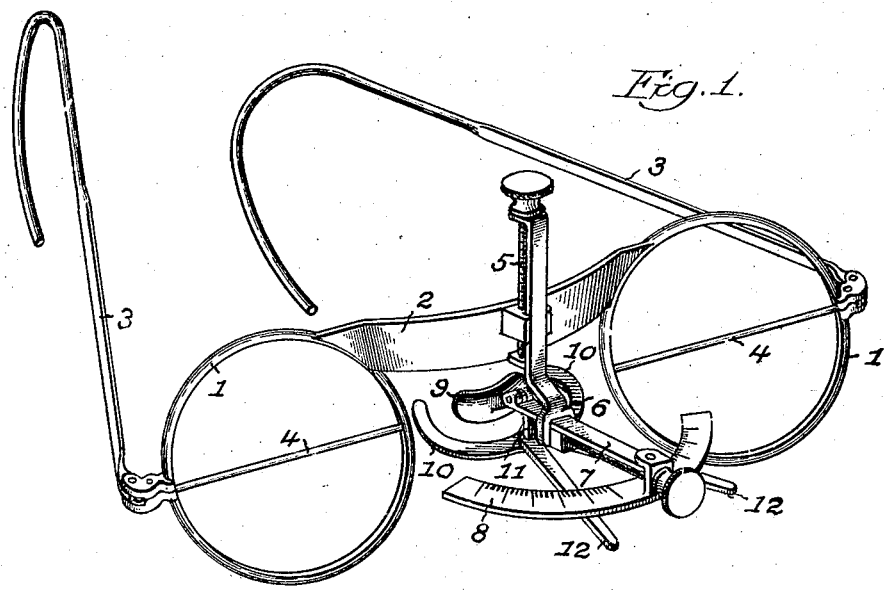
Fig. 1, is a perspective view illustrating the general arrangement of parts in the preferred form of the present invention.
Figure 2:
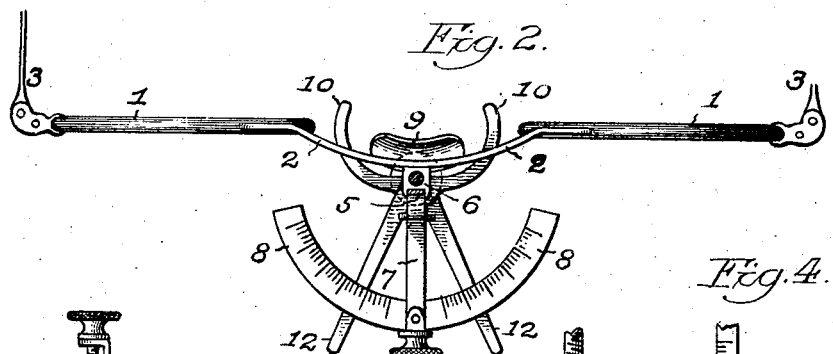
Fig. 2, is a top view of the same with parts in section.

As represented in the drawing, the main frame of the instrument is similar in form to an ordinary spectacle frame, and comprises a pair of circular frames or rings 1 connected together in spaced relation by a bridge piece or rail 2, which in the preferred form of the invention is arranged at the upper parts of the rings 1 and has a curved form as illustrated in Figs. 1 and 2 so as to give proper clearance to the forehead of the person being tested, with an avoidance of inconvenience or annoyance to such person and admit of free passage of light to the parts being measured.

3 designates ordinary temple bars attached to the outer sides of the rings 1 and adapted to engage around the ears of the person being tested to hold the instrument in place.

4 designates horizontal gage wires or bars extending across the openings of the rings 1, near the mid-height of the same, and adapted in the use of the instrument to be positioned in line with the pupillary center of the eyes of the person being tested.

5 designates a vertically adjustable slide having movement by an usual and suitable means on the central portion of the bridge or rail 2 and provided at its lower end with a guide head 6 for the support of parts as follows:—

7 designates a bar or rail adjustable longitudinally in a guide opening in the head 6 aforesaid, and carrying at its forward end a segmental scale plate 8 having graduations extending in each direction from a central point.

9 designates a nose piece or bridge mounted in a pivotal manner on the rear end of the bar or rail 7 and adapted to rest upon the nose of a person being tested to properly position the instrument in actual use. The pivotal connection of said parts is of any ordinary frictional type adapted to retain the nose piece in the position at which it is placed by the operator.

10, designates a pair of caliper jaws spanning the nose piece or bridge 9, pivoted on a central depending pin or stud 11 on the bar 7, while the shanks 12 of the jaws extend past the graduated segmental scale plate 8, to indicate the degree of adjustment imparted to said jaws by the finger of the operator upon the forward ends of the shanks 12. With the above described construction the caliper jaws 10 are capable of independent adjustment to afford separate measurements of the respective sides of the nose and afford an accurate indication of any variation thereof which may need attention in formation of the eyeglass frame for which the measurements are taken.

Figures 3, 4, 5:
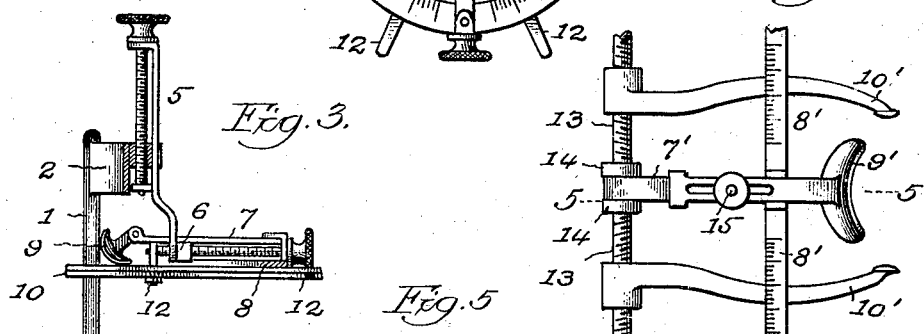
Fig. 3, is a central vertical section of the same.
Fig. 4, is a detail plan view of modified arrangement of parts.
Fig. 5, is a detail vertical section of same on line 5—5, Fig. 4.

In the modification illustrated in Figs. 4 and 5, the caliper jaws 10' are of the sliding type and have simultaneous movement to and from each other by means of a right and left hand screw shaft 13 revolubly mounted in a carrying rail 7' and held from axial longitudinal movement by collars 14 on said shaft having bearing against the respective sides of the rail. In the modified structure the carrying rail 7' constitutes a fixed portion of a main frame similar to that above described in connection with the preferred form of the invention, while the carrying rail of the nose rest or bridge 9' is longitudinally adjustable on the rail 7' by a clamping screw and elongated slot connection 15 to effect the required adjustment of said nose rest or bridge with relation to the contact points of the caliper jaws 10'.

Having thus fully described my invention, what I claim as new and desire to secure by Letters Patent, is:—

1. In an optician's instrument for measuring the relation of the nose to the pupils of the eyes, the combination of a pair of rings, a rail connecting said rings together in transverse spaced relation, temple bars attached to the sides of said rings, a nose rest carried by said rail midway of said pair of rings, a pair of adjustable caliper jaws spanning the nose rest, and graduated scales for indicating the adjustment of said caliper jaws.

2. In an optician's instrument for measuring the relation of the nose to the pupils of the eyes, the combination of a pair of rings, a rail connecting said rings together in transverse spaced relation, temple bars attached to the sides of said rings, a nose rest carried by said rail midway of said pair of rings, a pair of caliper jaws pivoted centrally of the nose rest and adapted for independent adjustment, and graduated scales for indicating the adjustment of said caliper jaws.

3. In an optician's instrument for measuring the relation of the nose to the pupils of the eyes, the combination of a pair of rings, a rail connecting said rings together in transverse spaced relation, temple bars attached to the sides of said rings, a nose rest mounted on said rail to have movement in a path midway between said rings, a pair of adjustable caliper jaws spanning the nose rest, and graduated scales for indicating the adjustment of said caliper jaws.

4. In an optician's instrument for measuring the relation of the nose to the pupils of the eyes, the combination of a pair of rings, a rail of a curved form connecting said rings together in transverse spaced relation and attached to the upper portions thereof, temple bars attached to the sides of said rings, a nose rest carried by said rail midway of said pair of rings, a pair of adjustable caliper jaws spanning the nose rest, and graduated scales for indicating the adjustment of said caliper jaws.

5. In an optician's instrument for measuring the relation of the nose to the pupils of the eyes, the combination of a pair of rings, a rail of a curved form connecting said rings together in transverse spaced relation and attached to the upper portions thereof, temple bars attached to the sides of said rings, a nose rest carried by said rail midway of said pair of rings, a pair of caliper jaws pivoted centrally of the nose rest and adapted for independent adjustment, and graduated scales for indicating the adjustment of said caliper jaws.

Signed at Chicago, Illinois, this 6th day of May, A. D. 1922.

WILLIAM R. UHLEMANN.